United States Patent
Agranat

(10) Patent No.: US 8,995,230 B2
(45) Date of Patent: Mar. 31, 2015

(54) METHOD OF EXTRACTING ZERO CROSSING DATA FROM FULL SPECTRUM SIGNALS

(75) Inventor: Ian Agranat, Concord, MA (US)

(73) Assignee: Wildlife Acoustics, Inc., Concord, MA (US)

( * ) Notice: Subject to any disclaimer, the term of this patent is extended or adjusted under 35 U.S.C. 154(b) by 433 days.

(21) Appl. No.: 13/558,945

(22) Filed: Jul. 26, 2012

(65) Prior Publication Data

US 2014/0028283 A1 Jan. 30, 2014

(51) Int. Cl.
*G01R 23/16* (2006.01)
*G01S 15/34* (2006.01)

(52) U.S. Cl.
CPC ........................... *G01S 15/34* (2013.01)
USPC .......................................................... 367/135

(58) Field of Classification Search
CPC ....... G01R 23/16; G08B 13/1672; G01H 3/00
USPC ............................ 367/136, 135, 98
See application file for complete search history.

(56) References Cited

U.S. PATENT DOCUMENTS

| | | | |
|---|---|---|---|
| 4,640,134 A | 2/1987 | Simmons | |
| 4,761,725 A | 8/1988 | Henze | |
| 4,949,580 A | 8/1990 | Graham et al. | |
| 5,623,220 A | 4/1997 | Betti et al. | |
| 6,233,107 B1 | 5/2001 | Minuhin | |
| 6,396,251 B2 | 5/2002 | Corva et al. | |
| 7,872,574 B2 | 1/2011 | Betts et al. | |
| 8,390,445 B2 | 3/2013 | Betts et al. | |
| 8,599,647 B2 * | 12/2013 | Agranat | 367/135 |
| 8,627,723 B2 * | 1/2014 | Agranat | 73/645 |
| 2011/0082574 A1 | 4/2011 | Pachet et al. | |
| 2011/0273964 A1 * | 11/2011 | Agranat | 367/135 |
| 2013/0036823 A1 * | 2/2013 | Agranat | 73/645 |
| 2014/0028283 A1 * | 1/2014 | Agranat | 324/76.21 |

FOREIGN PATENT DOCUMENTS

| | | |
|---|---|---|
| EP | 0116777 A2 | 8/1984 |
| WO | WO 2013022559 A1 * | 2/2013 |

* cited by examiner

*Primary Examiner* — Daniel Pihulic
(74) *Attorney, Agent, or Firm* — Lando & Anastasi, LLP

(57) ABSTRACT

Methods and apparatus for using Fourier techniques to detect and isolate the fundamental frequency sweep of echolocation calls produced by bats, or of other narrow-band whistles as produced by other kinds of animals such as birds and whales. According to one example, a Fourier transform is applied on blocks of input samples to produce output frames, and a narrowband frequency modulated signal is detected and traced through the output frames. A filter is applied in each frame to attenuate frequencies above or below the narrow-band signal, and an inverse Fourier transform is applied to produce an output signal. The resulting signal may then be analyzed with zero crossing techniques to measure the precise instantaneous frequency sweep.

10 Claims, 3 Drawing Sheets

METHOD OF EXTRACTING ZERO CROSSING DATA FROM FULL SPECTRUM SIGNALS

BACKGROUND

The ultrasonic echolocation calls produced by bats are typically narrowband frequency modulated signals that may be described as whistles or sweeps. Conventionally, two well-known techniques have been used to analyze the echolocation calls of bats.

One technique for analyzing echolocation calls is based on zero crossing analysis where the instantaneous frequency of the echolocation call can be determined precisely by measuring the time period between one or more zero crossing points in the original time-domain signal. This method can produce very high resolution information about the frequency modulation of the call through time. However, because zero crossing techniques measure the frequency component of the signal with the greatest amplitude, it is possible that the analysis will sometimes favor a harmonic of the signal or that the signal becomes undetectable in the presence of noise. Additionally, echoes present in the signal are difficult to isolate from the original signal due to the lack of amplitude information available to zero crossing techniques.

The second technique for analyzing echolocation calls is based on the Fourier transformation in which blocks of digitized samples from the time domain signal are transformed into frequency bins representing the power spectrum. Spreading the signal into several frequency components has the advantage of isolating the harmonic components of a signal and isolating the signal from noise present in other frequency bands to greatly improve overall detection. However, Fourier techniques have limited temporal and frequency resolution relating to the block size and are unable to directly produce the instantaneous and precise frequency information possible with zero crossing techniques.

SUMMARY OF THE INVENTION

Aspects and embodiments of the present invention make use of Fourier techniques to detect and isolate the fundamental frequency sweep of echolocation calls produced by bats, or any other narrow-band whistle as produced by other kinds of animals such as birds and whales. According to one embodiment, the isolated frequency sweep is then digitally filtered to remove unwanted harmonic components, background noise, and echoes. The filtered signal is then reconstructed in the time-domain and up-sampled to improve temporal resolution. The resulting signal may then be analyzed with zero crossing techniques to measure the precise instantaneous frequency sweep. This hybrid approach using Fourier techniques to produce a filtered signal for zero crossing analysis is advantageous over direct zero crossing analysis by making it possible to analyze signals in noisy environments and preventing the unintentional analysis of signal harmonics.

According to one embodiment, a method of enhancing a signal for zero crossing analysis, comprise receiving a stream of input samples, applying a Fourier transform on blocks of input samples to produce output frames, detecting and tracing a narrowband frequency modulated signal through the output frames, applying a filter in each frame to attenuate frequencies above or below the narrowband signal, applying an inverse Fourier transform to produce an output signal, and measuring a time between successive zero crossings in the output signal.

In one example of the method applying the filter includes applying the filter in the time domain to the output signal to produce a filtered output signal, and measuring the time between successive zero crossings in the output signal includes measuring the time between successive zero crossings in the filtered output signal. In another example, applying the filter is performed in the frequency domain, prior to applying the inverse Fourier transform, to produce a filtered signal, and applying the inverse Fourier transform includes applying the inverse Fourier transform to the filtered signal to produce the output signal. In another example applying the inverse Fourier transform includes up-sampling the filtered signal by applying a higher-order inverse Fourier transform to produce the output signal having a higher sample rate than a sample rate of the input stream of samples. The method may further include up-sampling the output signal using an interpolation filter to produce the output signal having a higher sample rate than a sample rate of the input stream of samples. In one example applying the filter includes applying a noise reduction filter. Applying the noise reduction filter may include applying a Wiener filter or spectral subtraction process, for example. In another example, applying the filter includes applying an echo cancellation filter. The method may further include determining that the detected narrowband signal is a harmonic of a fundamental signal, and detecting the fundamental signal by analyzing the output frames at a frequency that is an integral fraction of a frequency of the detected narrowband signal.

Still other aspects, embodiments, and advantages of these exemplary aspects and embodiments are discussed in detail below. Embodiments disclosed herein may be combined with other embodiments in any manner consistent with at least one of the principles disclosed herein.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to methods of using Fourier techniques to extract zero crossing data from narrowband frequency modulated signals. Although the zero crossing signals may be limited in that they are susceptible to background noise and harmonics of the signal, aspects and embodiments of the present invention may take advantage of full spectrum data to produce superior signals for zero crossing analysis, as discussed further below. These signals may represent animal calls, such as echolocation calls produced by bats, or whistles produced by other animals or birds, for example. The signals of interest embedded within the signals (data streams) to be analyzed using the methods discussed herein are generally referred to herein as "whistles," and may include various animal calls including, but not limited to, echolocation calls produced by bats.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
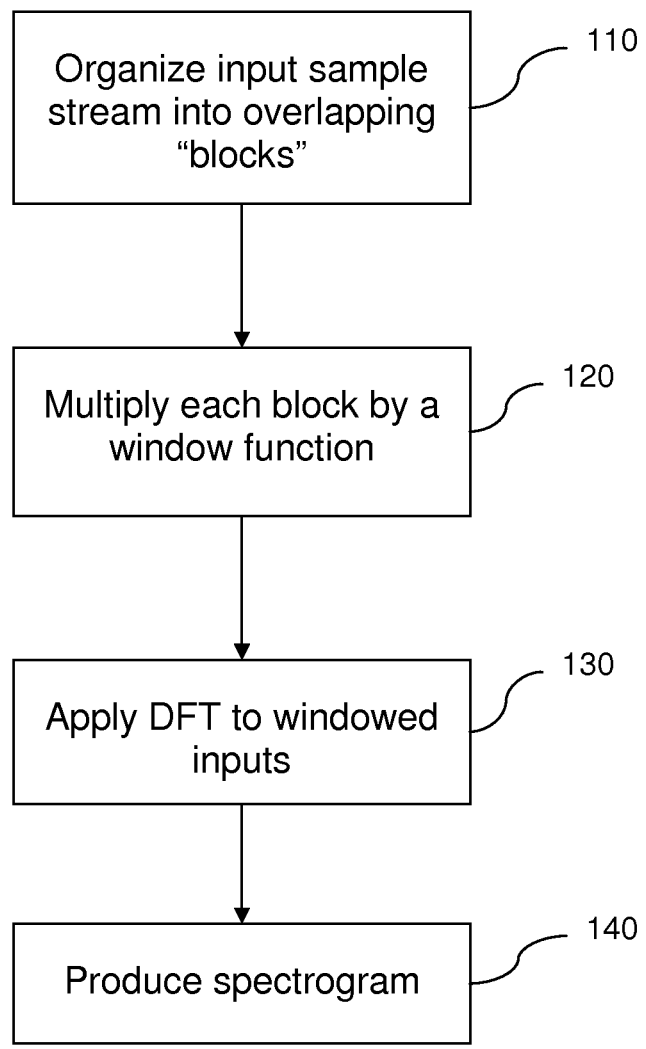
FIG. 1 is a flow diagram of one example of a method of according to aspects of the invention.

Referring to FIG. 1, according to one embodiment, a stream of input samples produced at a known sample rate R is organized into overlapping blocks (step 110). Each block may include N samples (N being a positive integer) and have a specified percentage overlap with the next block. For example, 50% overlapping blocks of 128 samples each may be created by taking next 128 consecutive samples of the input stream and then rewinding the input stream by 64 samples before creating the next block. In step 120, each block of input samples is multiplied by a window function such as the Hann window, for example. In step 130, an N-point real-value Discrete Fourier Transform (DFT) is performed on the windowed inputs to produce frames of complex-value frequency bins. For example, a 128-point real-value DFT may be performed on the windowed inputs to produce a frame of 65 complex-value frequency bins. The size of the DFT and number of frequency bins may be selected based on various factors including, but not limited to, the sample rate of the input stream and known information about the animal whistle being analyzed. For example, if the sample rate, R, is 256,000 samples per second, applying a 128-point DFT to produce a frame with 65 frequency bins, as in the example above, results in 4,000 frames per second with frequency bin resolution of 2,000 Hz. This is appropriate for the detection and analysis of the echolocation calls produced by many species of bats. However, those skilled in the art will appreciate, given the benefit of this disclosure, that a different sample rate, block size, window function, and/or overlap percentage may be selected for the analysis of different kinds of animal whistles.

A spectrogram corresponding to the input signal may be formed as a three-dimensional image (step 140) such that one dimension corresponds to a period of time as represented by each frame, a second dimension corresponds to a range of frequencies as represented by each bin in a given frame, and a third dimension corresponds to the amplitude of the signal as represented by the complex value of the DFT for any given bin of any given frame.

According to certain embodiments, it may be desirable to apply a noise reduction technique. An estimate of the background noise spectrum is needed for most noise reduction techniques. In one embodiment, it is assumed that lower amplitude values occurring in each bin across frames corresponds to background noise occurring between the animal calls of interest. With knowledge of the maximum expected duration of animal whistles and the minimum duration between animal whistles, an estimate of the background noise may be determined for each frequency bin as follows.

Figure 2:
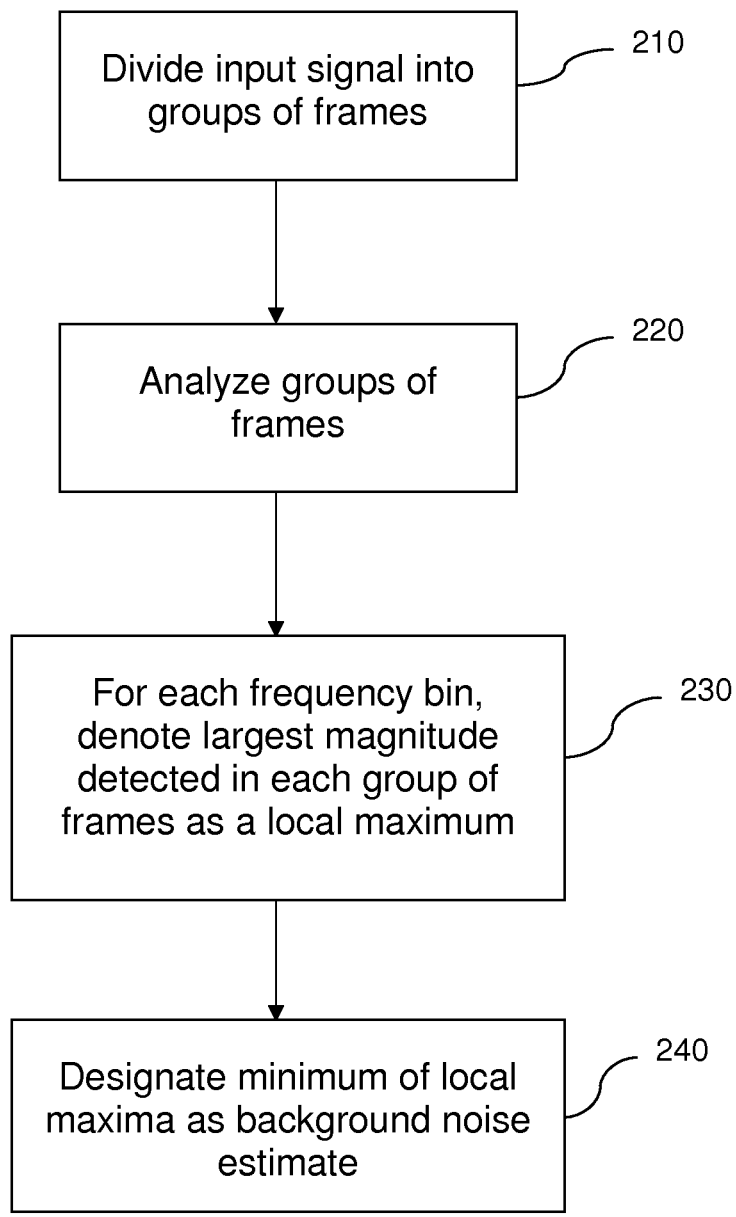
FIG. 2 is a flow diagram of one example of a method of according to aspects of the invention.

Referring to FIG. 2, in step 210 the input signal is divided into groups of several frames no longer than half of the expected minimum duration between animal whistles. For example, if the minimum duration between animal whistles is 50 milliseconds (ms), a reasonable value for the echolocation calls of many bats, then groups of no more than 100 frames (25 ms at 4,000 frames per second) duration may be selected as an appropriate value. Several such groups are then analyzed spanning at least the longest expected whistle duration in addition to the shortest expected time between whistles (step 220). For example, if the longest whistle is on the order of about 450 ms, then (for the above example) at least 20 groups of 100 frames may be considered to be substantially certain that at least one group lies entirely between whistles and therefore represents the background noise. For each frequency bin, the largest magnitude found across frames in each group may be noted as a local maximum (step 230). In one embodiment, the minimum value of the local maxima across all the groups is then designated to be used as the background noise estimate (step 240).

In one embodiment, noise reduction is performed with a Wiener filter using the estimate of the background noise spectrum (obtained in step 240). For a given bin, if the bin amplitude is B and the noise estimate is N, then the estimated signal after Wiener noise reduction is give by:

$$S = B * \left( \frac{B^2}{B^2 + N^2} \right) \quad (1)$$

The estimated signal-to-noise ratio is S/N. Alternatively, other methods of noise reduction such as spectral subtraction, for example, may be employed. A noise-reduction filter may be applied in the time domain after an inverse Fourier transform is applied to the output frames to reconvert the signal to the time domain (e.g., step 380 discussed below), or may be applied in the frequency domain before the inverse Fourier transform is applied.

Analysis of specific types of animal whistles can be constrained to a band of frequencies in which those signals are expected to occur. For example, the echolocation calls of many bats are between 20 kHz and 120 kHz. According to one embodiment, a candidate whistle may be detected by searching frames for a bin within the expected range of frequencies in which the amplitude or signal-to-noise ratio exceeds a given threshold. The specific frame and bin containing the above-threshold signal may then be used as a starting point for tracing the candidate whistle through the spectrogram.

A wide variety of image edge detection or ridge tracing techniques may be employed to trace the candidate whistle through the spectrogram beginning at the selected starting point. In one embodiment, the spectrogram is first blurred with a Gaussian blur filter to reduce the effects of noise. From the starting point, a tracing algorithm may follow the bins of the starting frame up or down to find a local maximum. The candidate whistle may be traced in the forward direction by advancing to the next frame and repeating the process until the whistle amplitude falls below a threshold of detectability. The same process may be repeated in the backward direction from the starting point to complete the trace. The candidate whistle may be traced in the forward direction and then the backward direction, or vice versa. Alternative methods such as gradient ascent, for example, may also be employed. In one embodiment, multiple candidate whistles overlapping in time may be traced using these techniques. The output of the trace is a sequence of time and frequency values representing the frequency track of the whistle through time. In one embodiment, for each frame, the bandwidth of the whistle is also determined by looking for the bins above and below the traced ridge corresponding to the local minimum amplitude.

Some whistles may contain harmonics which appear as additional whistles at integer multiples of the fundamental frequency. It may be desirable to determine if a whistle is a first or second harmonic of the fundamental. This may be achieved by looking for local peaks at one half or one third of the frequency. In one embodiment, the selected starting point may be adjusted so as to trace the fundamental rather than one of its harmonics.

Prior to tracing the candidate whistle, the signal may be further enhanced with echo reduction. There are many conventional techniques for echo cancellation; however, many of these assume fixed sound sources. Bats in flight and other animals in motion may not be as conveniently modeled. According to one embodiment of the present invention, a simple technique is employed to enhance the signal by removing the frame-by-frame echo response in the frequency domain, as discussed below with reference to FIG. 3.

First, an estimate of the echo profile may be obtained by analyzing the maximum energy track of the candidate whistle (step 310). This may provide an indication of the delays and relative amplitude of echoes within the signal. In a spectrogram, there may be many echoes and the echoes may be blurred together within a few FFT frames, rather than having a clear separation between echoes. As a result, it may be more difficult to accurately trace the candidate whistle. In the example of bat calls, it may be particularly difficult to trace the call accurately at the end of the call because many bat calls become "flat" in frequency near the end of the call, making it more difficult to distinguish between the end of the call and the beginning of an echo. Accordingly, removing the frame-by-frame echo response may facilitate accurately tracing the candidate whistle. For points where the whistle frequency is changing quickly through time, the residual energy in subsequent frames at the same frequency may be used to estimate the echo profile out several frames beyond the signal. For example, it may be observed that the energy level "before" (e.g., to the left of) the peak signal at a given frequency in the sweep corresponds to normal background energy, and "after" (e.g., to the right) of the peak signal at that frequency are echoes. The presence of the echoes may be manifested as some energy at frame t+1, t+2, t+3, etc., that is above the energy at t−1 for the same frequency. Accordingly, through observation of the spectrogram, the "envelope" of the echo may be estimated as a power spectrum in which $P_{t+1}-P_{t-1}$ (where P is power and t is time measured in frames) is an estimate of the echo energy in frame t+1. Similarly, an estimate of the echo energy in frame t+2 is given by $P_{t+2}-P_{t-1}$. The estimates may be obtained for a selected number of frames forward, sufficient for to allow the candidate whistle to be traced more accurately trace through the frequency sweep by removing the echo as explained further below. The energy estimates provide the echo profile discussed above.

The echo energy is generally a function of the signal energy. Accordingly, the estimated echo profile may be modeled a time-domain filter response, an inverse function that would cancel the echo response may be solved from the time-domain filter response, and the resulting filter may be applied across the spectrogram to reduce the echo prior to the signal tracing step.

Figure 3:
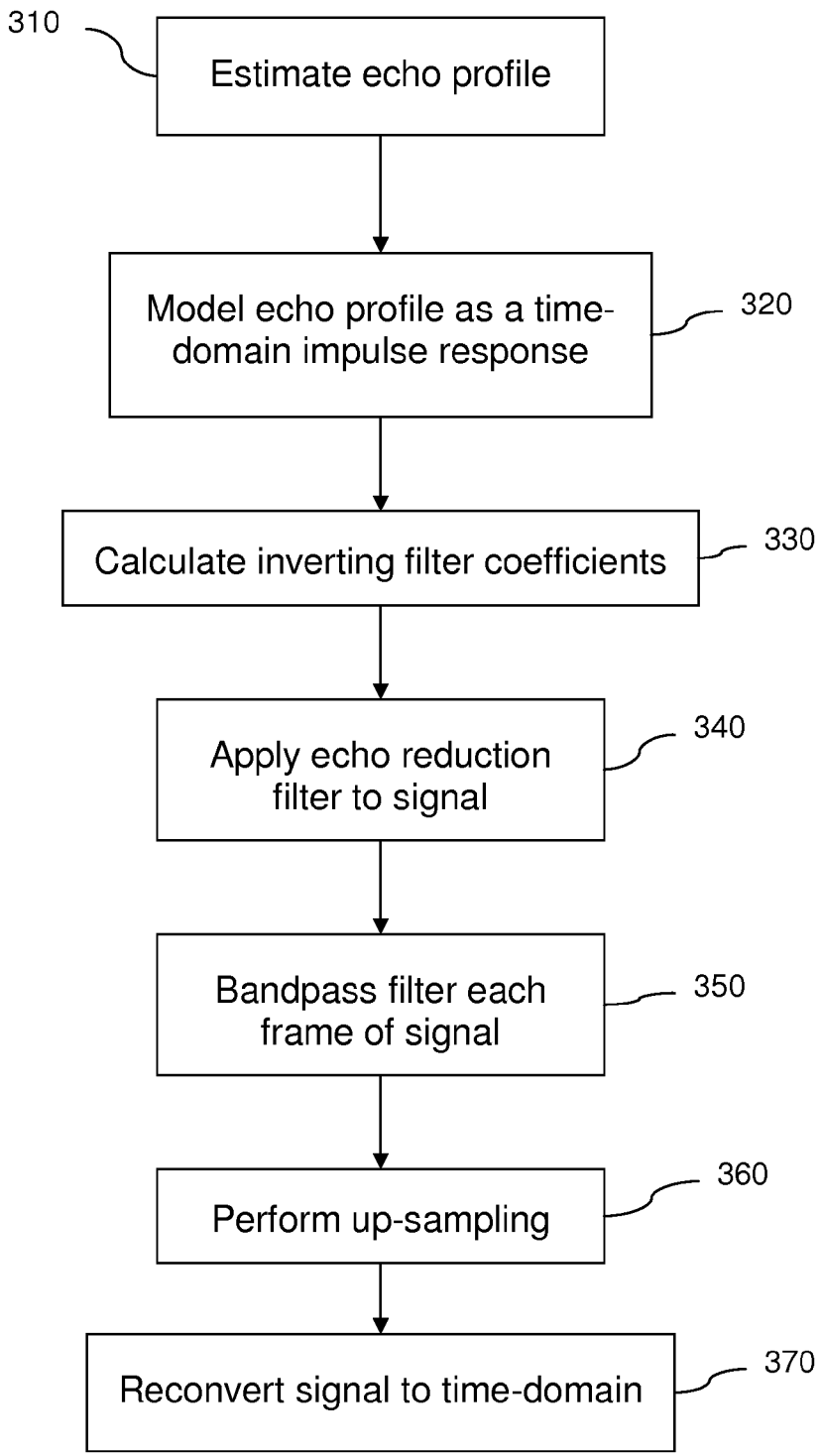
FIG. 3 is a flow diagram of one example of a method of removing frame-by-frame echo responses according to aspects of the invention.

Still referring to FIG. 3, the echo profile may be modeled as a time-domain impulse response (step 320), and the inverting filter coefficients may be calculated (step 330). The resulting echo reduction filter may be applied to the signal to further enhance the signal (step 340). In one example, each frame is then band-pass filtered (step 350) to include only those bins containing detectable portions of the animal whistle and excluding other bins likely to contain only background noise, harmonics, or other unrelated signals. The frames may then be up-sampled (step 360) and returned to the time domain using an inverse Fourier transform and the overlap-and-add method known to those skilled in the art (step 370). Up-sampling may be useful to interpolate points to increase the temporal resolution of zero crossings beyond the original sample rate if greater precision is desirable. In one example, an up-sample factor of four, when using a sample rate of 256,000 samples per second, results in sub-microsecond precision. The zero crossings of the resulting time-domain signal may then be analyzed to obtain information about the animal whistle(s).

Thus, aspects and embodiments of the present invention provide methods for conditioning and using full spectrum signals that may contain animal whistles to provide signals that are better suited for zero crossing analysis, allowing for more accurate zero crossing analysis. The zero crossing analysis may then provide useful information about the animal whistle that may be used to identify the animal, or for other purposes.

The methods or various steps thereof discussed herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers, web servers, and mobile computing devices. Embodiments of the methods, acts, and processes discussed herein may be implemented using hardware or a combination of hardware and software. For instance, in one embodiment, the methods, acts, and processes are implemented as one or more software components that are stored within data storage and executed by a processor associated with a computer system. In other examples, the methods, acts, and processes may be implemented using an application-specific integrated circuit ("ASIC") that is coupled to a processor associated with a computer system and tailored to perform specific tasks. Thus, embodiments of the methods, acts, and processes discussed herein, and functions thereof, are not limited to a particular hardware or software implementation, and may be implemented in software, hardware or firmware, or any combination thereof, not limited to any particular computer architecture, network, or communication protocol.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A method of enhancing a signal for zero crossing analysis, the method comprising:
   receiving a stream of input samples;
   applying a Fourier transform on blocks of the input samples to produce output frames;

detecting and tracing a narrowband frequency modulated signal through the output frames;

applying a filter in each frame to attenuate frequencies above or below the narrowband signal;

applying an inverse Fourier transform to produce an output signal; and measuring a time between successive zero crossings in the output signal.

2. The method of claim 1, wherein applying the filter includes applying the filter in the time domain to the output signal to produce a filtered output signal; and wherein measuring the time between successive zero crossings in the output signal includes measuring the time between successive zero crossings in the filtered output signal.

3. The method of claim 1, wherein applying the filter is performed in the frequency domain, prior to applying the inverse Fourier transform, to produce a filtered signal; and wherein applying the inverse Fourier transform includes applying the inverse Fourier transform to the filtered signal to produce the output signal.

4. The method of claim 3, wherein applying the inverse Fourier transform includes up-sampling the filtered signal by applying a higher-order inverse Fourier transform to produce the output signal having a higher sample rate than a sample rate of the input stream of samples.

5. The method of claim 1, further comprising up-sampling the output signal using an interpolation filter to produce the output signal having a higher sample rate than a sample rate of the input stream of samples.

6. The method of claim 1, wherein applying the filter includes applying a noise reduction filter.

7. The method of claim 6, wherein applying the noise reduction filter includes applying a Wiener filter.

8. The method of claim 6, wherein applying the noise reduction filter includes applying a spectral subtraction process.

9. The method of claim 1, wherein applying the filter includes applying an echo cancellation filter.

10. The method of claim 1, further comprising:

determining that the detected narrowband signal is a harmonic of a fundamental signal; and detecting the fundamental signal by analyzing the output frames at a frequency that is an integral fraction of a frequency of the detected narrowband signal.

\* \* \* \* \*